United States Patent

Nagaoka et al.

[11] Patent Number: 4,868,276
[45] Date of Patent: Sep. 19, 1989

[54] PROCESS FOR PRODUCING POLYPHENYLENE OXIDE WITH ALKANOLAMINE AND SECONDARY AMINE

[75] Inventors: Kenji Nagaoka; Yoshiharu Tatsukami; Masahiro Fujiwara, all of Osaka; Katsuhiro Abe, Mie; Kazunori Yano, Mie; Ryuhei Matsui, Mie, all of Japan

[73] Assignees: Sumitomo Chemical Company, Osaka; Mitsubishi Petrochemical Company, Tokyo, both of Japan

[21] Appl. No.: 88,323

[22] Filed: Aug. 24, 1987

[30] Foreign Application Priority Data

Aug. 22, 1986 [JP] Japan .................. 61-197862

[51] Int. Cl.$^4$ ............................................. C08G 65/44
[52] U.S. Cl. .................................. 528/215; 528/212; 528/216; 528/217
[58] Field of Search ................ 528/215, 217, 212, 216

[56] References Cited

U.S. PATENT DOCUMENTS 3,787,361  1/1974  Nakashio et al. .................. 528/215
4,083,828  4/1978  Olander ........................ 260/47 ET

FOREIGN PATENT DOCUMENTS 0132608  2/1985  European Pat. Off. .
0183567  6/1986  European Pat. Off. .

OTHER PUBLICATIONS

Patent Abstracts of Japan, vol. 6, No. 118 (C-111) (996), 2nd Jul. 1982.

Primary Examiner—Harold D. Anderson
Attorney, Agent, or Firm—Sughrue, Mion, Zinn, Macpeak & Seas

[57] ABSTRACT

A process for producing a plyphenylene oxide is disclosed, comprising oxidative polymerization of a nucleus-substituted phenol with an oxygen-containing gas in an organic solvent in the presence of a catalyst system comprising a manganese compound containing at least one divalent manganese salt, at least one basic compound selected from hydroxides, alkoxides or phenoxides of the group IA metals of the Periodic Table and hydroxides or oxides of the group IIA metals of the Periodic Table, an alkanolamine represented by formula (I)

$$R^1\text{—NH—}R^2\text{—OH} \qquad (I)$$

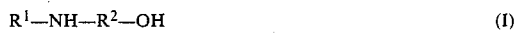

wherein $R^1$ represents a hydrogen atom, an alkyl group having from 1 to 12 carbon atoms, or a hydroxyl-substituted alkyl group having from 1 to 12 carbon atoms; and $R^2$ represents an alkylene group having from 2 to 12 carbon atoms, and an amine represented by formula (II)

$$R^3R^4NH \qquad (II)$$

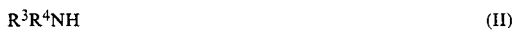

wherein $R^3$ and $R^3$ each represents a hydrogen atom, an alkyl group having from 1 to 24 carbon atoms, or an aralkyl group having from 7 to 24 carbon atoms, with proviso that $R^3$ and $R^4$ do not simultaneously represent a hydrogen atom, or $R^3$ and $R^4$ may be taken together to form a ring. The polyphenylene oxide produced has improved planar impact characteristics without failure in other properties and is, therefore, suitable as a starting material for the production of polyphenylene oxide-based polymer alloy.

13 Claims, No Drawings

PROCESS FOR PRODUCING POLYPHENYLENE OXIDE WITH ALKANOLAMINE AND SECONDARY AMINE

FIELD OF THE INVENTION

This invention relates to a process for producing a polyphenylene oxide. More particularly, it relates to a process for producing a polyphenylene oxide by oxidative polymerization of a nucleus-substituted phenol in the presence of a catalyst containing a manganese compound, a basic compound, an alkanolamine, and a primary and/or secondary amine.

BACKGROUND OF THE INVENTION

Polyphenylene oxides obtained by oxidative polymerization of nucleus-substituted phenols are known to be useful resins. In particular, a polymer alloy or polyblend comprising polyphenylene oxide and polystyrene or polyamide possesses excellent thermal, mechanical, and electrical properties and has recently broadened its application as a molding material in various fields.

Many processes for producing polyphenylene oxides by oxidative polymerization of nucleus-substituted phenols are known in the art. The oxidative polymerization is commonly carried out using a catalyst system comprising a combination of a copper, manganese or cobalt compound and a ligand selected from various amines and bases, and many proposals have so far been made on such a catalyst system. Of these, a catalyst system comprising a manganese compound combined with a basic compound such as sodium hydroxide, as described in Japanese Patent Publication No. 30354/70, is noteworthy because of not only good economy but also its high activity. However, this catalyst system has problems such that the molecular weight of the resulting polyphenylene oxide cannot be controlled and the resulting polyphenylene oxide is gelled on heat melting.

In order to solve these problems, the inventors previously proposed a catalyst system comprising monoethanolamine and/or diethanolamine, a manganese compound, and a basic compound as disclosed in Japanese Patent Application (OPI) No. 44625/82 (the term "OPI" as used herein means an "unexamined published application"). It has also been proposed recently to use an N-alkylalkanolamine in place of the monoethanolamine and/or diethanolamine as disclosed in Japannese Patent Application (OPI) No. 8318/85.

According to these techniques, the problem of molecular weight control and gelation on heat melting can be settled. However, the resulting polyphenylene oxide turned out to be still unsatisfactory as a starting resin of a polymer alloy with polystyrene or polyamide. For example, molded articles obtained by injection molding of the aforesaid polymer alloy are of inferior quality, e.g., in planar impact resistance.

SUMMARY OF THE INVENTION

An object of this invention is to provide a process for producing a polyphenylene oxide suitable for producing a polyphenylene oxide-based polymer alloy having improved planar impact characteristics.

In the light of the above object, the inventors conducted extensive investigations on a process for producing a polyphenylene oxide in the presence of a catalyst system comprising a combination of a manganese compound and a basic compound which is of great benefit in economy. As a result, it has now been found that a polyphenylene oxide of superior quality meeting the purpose of the present invention can be obtained by using a catalyst system comprising a manganese compound and a basic compound combined with a specific alkanolamine and a specific amine as compared with those combined with either one of the alkanolamine or the amine alone, the latter having been disclosed in Japanese Patent Publication No. 30355/70 and Japanese Patent Application (OPI) No. 79993/78. The present invention has been completed based on this finding.

The present invention relates to a process for producing a polyphenylene oxide which comprises oxidative polymerization of a nucleus-substituted phenol with an oxygen-containing gas in an organic solvent in the presence of a catalyst system comprising a manganese compound containing at least one divalent manganese salt, at least one basic compound selected from hydroxides, alkoxides or phenoxides of the group IA metals of the Periodic Table and hydroxides or oxides of the group IIA metals of the Periodic Table, an alkanolamine represented by formula (I) shown below, and an amine represented by formula (II) shown below.

Formula (I) is represented by formula $$R^1-NH-R^2-OH \qquad (I)$$

wherein $R^1$ represents a hydrogen atom, an alkyl group having from 1 to 12 carbon atoms, or a hydroxyl-substituted alkyl group having from 1 to 12 carbon atoms; and $R^2$ represents an alkylene group having from 2 to 12 carbon atoms.

Formula (II) is represented by formula $$R^3R^4NH \qquad (II)$$

wherein $R^3$ and $R^4$ each represents a hydrogen atom, an alkyl group having from 1 to 24 carbon atoms, or an aralkyl group having from 7 to 24 carbon atoms, with proviso that $R^3$ and $R^4$ do not simultaneously represent a hydrogen atom, or $R^3$ and $R^4$ may be taken together to form a ring.

DETAILED DESCRIPTION OF THE INVENTION

The nucleus-substituted phenol which can be used in the present invention is represented by formula (III)

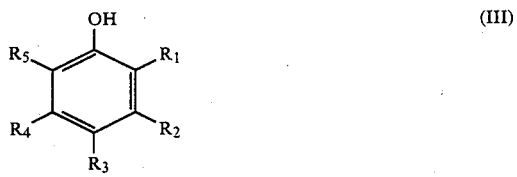

wherein $R_1$, $R_2$, $R_3$, $R_4$, and $R_5$ each represents a hydrogen atom, a halogen atom, a hydrocarbon group, a cyano group, a hydrocarbonoxy group, or a substituted hydrocarbonoxy group, with at least one of them being a hydrogen atom and at least one of the rest being other group than a hydrogen atom.

Specific examples of the nucleus-substituted phenol represented by formula (III) include 2-methylphenol, 3-methylphenol, 2-ethylphenol, 2-methyl-6-benzylphenol, 2,6-dimethylphenol, 2-methyl-6-ethylphenol, 3-methyl-6-t-butylphenol, 2,6-diallylphenol, 2,6-diphenylphenol, 2,6-dichlorophenol, 2,6-dibromophenol, 2,6-dimethoxyphenol, 4-cyanophenol, 2,3,6-trimethylphenol, 2,4-dimethyl-3-chlorophenol, etc.

These compounds may be used either individually or in combination of two or more thereof.

The manganese compound which can be used in the present invention includes manganese halides, e.g., manganese chloride, manganese bromide, etc.; manganese salts with organic or inorganic acids, e.g., manganese nitrate, manganese sulfate, manganese carbonate, manganese formate, manganese acetate, manganese oxalate, manganese naphthenate, etc.; manganates, e.g., sodium manganate; permanganates, e.g., potassium permanganate, calcium permanganate, etc.; manganese hydroxide; and manganese oxide.

These manganese compounds may be either anhydrous or hydrated. Of these, preferred are manganese chloride, manganese bromide, and manganese acetate.

One of advantages characteristic of the present invention resides in that oxidative polymerization proceeds with an extremely small amount of the manganese compound. In carrying out the present invention, the above-described manganese compound is used in an amount of 0.00001 mol or more, preferably 0.0001 mol or more, per mol of the nucleus-substituted phenol. If the amount of the manganese compound to be used is less than 0.00001 mol, progress of the oxidative polymerization is insubstantial or, if any, very slow. There is no particular upper limit of the amount to be used.

The basic compound which can be used in the present invention includes hydroxides of the group IA metals of the Periodic Table, e.g., lithium hydroxide, sodium hydroxide, potassium hydroxide, etc.; hydroxides or oxides of the group IIA metals of the Periodic Table, e.g., calcium hydroxide, magnesium hydroxide, calcium oxide, etc.; alkoxides of the group IA metals of the Periodic Table, e.g., sodium methoxide, potassium methoxide, sodium ethoxide, sodium n-propoxide, sodium isopropoxide, potassium t-butoxide, etc.; and phenoxides of the group IA metals of the Periodic Table, e.g., sodium phenoxide, potassium phenoxide, etc. Preferred of them are sodium hydroxide and potassium hydroxide. These basic compounds are fed to the reaction system either as they are or as dissolved in a polar solvent such as alcohols.

The amount of the basic compound to be added ranges from 10 to 10,000 mols, preferably from 50 to 1,000 mols, per mol of the manganese compound. If it is less than 10 mols, the rate of polymerization attained is extremely low. Amounts exceeding 10,000 mols produce no further effects and are thus uneconomical.

The purpose of producing a polyphenylene oxide having excellent qualities can first be accomplished by using both a specific alkanolamine and a specific amine in combination with the aforesaid manganese compound and basic compound. The specific alkanolamine herein referred to is an alkanolamine having a primary or secondary amino group moiety and is represented by formula (I). In formula (I), specific examples of $R^1$ include a hydrogen atom, a methyl group, an ethyl group, a propyl group, a butyl group, a 2-hydroxyethyl group, etc.; and specific examples of $R^2$ include an ethylene group, a propylene group, a butylene group, etc. Specific examples of the alkanolamine represented by formula (I) are monoethanolamine, N-methylethanolamine, N-ethylethanolamine, isopropanolamine, isobutanolamine, di-n-propanolamine, diisopropanolamine, diethanolamine, diisobutanolamine, etc. Preferred among them are monoethanolamine, diisopropanolamine, and diethanolamine, with diethanolamine being more preferred.

The alkanolamine of formula (I), when used in an amount of a specific range based on the nucleus-substituted phenol, exhibits an activity to accelerate oxidative polymerization and plays an essential role in catalytic action. The amount of the alkanolamine to be used ranges from 0.001 to 0.3 mol, preferably from 0.005 to 0.1 mol, per mol of the nucleus-substituted phenol. The alkanolamine in an amount less than 0.001 mol or more than 0.3 mol per mol of the nucleus-substituted phenol fails to obtain polyphenylene oxides having practically useful molecular weights.

The amine which can be used in the present invention is a primary or secondary amine represented by formula (II). Specific examples of $R^3$ and $R^4$ in formula (II) include a hydrogen atom, a methyl group, an ethyl group, a propyl group, a butyl group, a pentyl group, a hexyl group, an octyl group, a decyl group, a dodecyl group, a benzyl group, etc. Specific examples of the amines of formula (II) are primary amines, e.g., n-propylamine, isopropylamine, n-butylamine, isobutylamine, sec-butylamine, n-hexylamine, n-octylamine, 2-ethylhexylamine, cyclohexylamine, laurylamine, benzylamine, etc.; and secondary amines, e.g., diethylamine, di-n-propylamine, diisopropylamine, di-n-butylamine, diisobutylamine, di-n-octylamine, piperidine, 2-pipecoline, etc. Polyamines that can be regarded to contain a moiety represented by formula (II) as a repeating unit are equivalent to the amines of formula (II) and are, therefore, embraced in the scope of the present invention. Examples of such polyamines are ethylenediamine, piperazine, and 1,3-dipiperidylpropane. Of these amines including polyamines, preferred are primary amines, e.g., n-butylamine and isobutylamine; and secondary amines, e.g., diethylamine, di-n-propylamine, di-n-butylamine, diisobutylamine, piperidine, and 2-pipecoline, with secondary amines, e.g., di-n-butylamine and piperidine, being more preferred.

The above-described amine is used in an amount of from 0.001 to 0.2 mol, preferably from 0.005 to 0.05 mol, per mol of the nucleus-substituted phenol. If its amount is less than 0.001 mol, substantial effects of obtaining a high-quality polyphenylene oxide cannot be achieved. If it is more than 0.2 mol, a polyphenylene oxide having a practically useful molecular weight cannot be produced.

The organic solvent which can be used in the present invention is not particularly limited as far as it is inert to the nucleus-substituted phenol and is liquid at the reaction temperature. Suitable organic solvents include aromatic hydrocarbons, e.g., benzene, toluene, xylene, etc.; cyclic or acyclic aliphatic hydrocarbons, e.g., heptane, cyclohexane, etc.; halogenated hydrocarbons, e.g., chlorobenzene, dichlorobenzene, dichloromethane, etc.; ethers, e.g., dioxane, diethyl ether, etc.; ketones, e.g., cyclohexanone, acetophenone, etc.; esters, e.g., ethyl acetate, propiolactone, etc.; nitriles, e.g., acetonitrile, benzonitrile, etc.; alcohols, e.g., methanol, ethanol, n-propanol, isopropanol, n-butanol, sec-butanol, etc.; nitrobenzene; sulfolane; and so on. These organic solvents may be used either individually or in combination thereof. Preferred organic solvents are mixed solvents of aromatic hydrocarbons and alcohols. More preferred are a mixed solvent of toluene with methanol, ethanol, n-propanol, or isopropanol; and a mixed solvent of xylene with methanol, ethanol, n-propanol, or isopropanol.

In carrying out the present invention, the aforesaid organic solvent is used in an amount so that the nucleus-substituted phenol solution has a concentration of from 5 to 35% by weight, preferably from 10 to 25% by weight. In concentrations out of this range, polyphenylene oxides having practically useful molecular weights cannot be obtained.

The oxygen-containing gas to be used in the oxidative polymerization includes pure oxygen and a mixed gas such as air.

In carrying out the present invention, the nucleus-substituted phenol, the manganese compound, the basic compound, the alkanolamine, the amine, and the solvent are supplied to a reactor either separately or in admixture of all or some of them and contacted with the oxygen-containing gas under predetermined temperature and pressure conditions. The feed rate of the oxygen-containing gas to the reaction system is selected arbitrarily while taking into consideration heat removal, etc., and is usually 10 Nml/min or more as pure oxygen per mol of the nucleus-substituted phenol charged. It is necessary to sufficiently contact the reaction mixture with oxygen by, for example, a commonly employed gas-liquid contact means such as blowing of an oxygen-containing gas into the reaction mixture under vigorous stirring. The reaction can be conducted in either a batch system or a continuous system. The reaction temperature is selected from a range within which the reaction smoothly proceeds while maintaining the reaction system in a liquid phase, usually a range of from 0° to 100° C. and preferably of from 10° to 60° C. At temperatures lower than 0° C., the rate of polymerization is too low, whereas at temperatures higher than 100° C., the polymerization does not substantially proceed. The reaction pressure is not particularly restricted and can be selected arbitrarily. A preferred pressure is from atmospheric pressure to about 20 atms. The reaction time varies depending on the amount of the catalyst, the concentration of the nucleus-substituted phenol, the feed rate of the oxygen-containing gas, and the like and preferably ranges from 0.5 to 20 hours.

After reacting for a predetermined period of time, the produced polyphenylene oxide is obtained in the form of a solution in a polymerization solvent or in the form of a slurry of solid particles. The polyphenylene oxide can be isolated from the reaction mixture as a final product by various working-up techniques. For example, the reaction mixture is treated with an acid, e.g., hydrochloric acid and acetic acid, to deactivate the catalyst in the system and then contacted with a non-solvent for the polyphenylene oxide, e.g., alcohols, to obtain a slurry which is then subjected to solid-liquid separation, followed by washing and drying the resulting solid. Otherwise, the reaction mixture is washed with water and then subjected to liquid-liquid partition, and the organic solvent in the separated organic phase is removed by steam stripping to obtain an aqueous slurry which is then subjected to solid-liquid separation and drying. The solid-liquid separation can be effected by the use of commonly employed means, e.g., a centrifugal separator, a decanter, a vacuum filter, etc. The drying can be performed by means of ordinary devices, e.g., a vacuum drier, a rotary drier, a paddle drier, a flow drier, etc.

The present invention will now be illustrated in greater detail by way of the following examples, but it should be understood that the present invention is not limited thereto. In these examples, physical properties of the produced polyphenylene oxide were determined according to the following methods.

Reduced Viscosity ($\eta sp/c$):
Determined in a 0.5 g/dl solution in chloroform at 25° C.

Du Pont Impact Strength (kg·cm):
Ten sheets of specimens each having a thickness of 1.6 mm and a diameter of 100 mm are horizontally mounted on a cylinder having an inner diameter of 25 mm with its radial being in a horizontal direction. A metal rod having a semispherical tip of 10 mm in curvature radius is set on the specimen so that the semispherical tip contacts with the specimen, and a weight of 2.5 kg is fallen onto the metal rod from a prescribed height. The Du Pont impact strength which is a measure for planar impact characteristics is calculated by multiplying 2.5 kg by the height at which a half of the specimens (5 sheets) are broken.

Heat Distortion Temperature (HDT):
Measured in accordance with ASTM D648.

Tensile Strength:
Measured in accordance with ASTM D638 using an ASTM dumbbell specimen.

Elongation:
Measured in accordance with ASTM D638 using an ASTM dumbbell secimen.

Notched Izod Impact Strength ($N_I$):
Measured in accordance with ASTM D256 using a specimen having a thickness of 3.2 mm.

EXAMPLE 1

In a 10 l-volume jacketed autoclave equipped with a stirrer, a thermometer, a condenser, and a tube for introducing air which reached the bottom of the autoclave were charged 3420 g of xylene, 1366 g of methanol, 1222 g (10 mols) of 2,6-dimethylphenol, and 24 g (0.6 mol) of sodium hydroxide to form a uniform solution. To the solution was added a solution of 31.5 g (0.3 mol) of diethanolamine, 19.4 g (0.15 mol) of di-n-butylamine, and 0.99 g (0.005 mol) of manganese chloride tetrahydrate in 100 g of methanol. Air was then bubbled through the solution at a rate of 5 l/min while vigorously stirring. While continuing the bubbling, the reaction temperature and pressure were maintained at 35° C. and 9 kg/cm$^2$, respectively. After the elapse of 7 hours from the start of bubbling, the air feed was stopped, and the reaction mixture was poured into a mixture of 66 g (1.15 mols) of acetic acid and 4900 g of methanol. The resulting slurry was filtered under reduced pressure to isolate a polyphenylene oxide in a wet state. The isolated polyphenylene oxide was washed with 7200 g of methanol and dried under reduced pressure overnight at 150° C. to obtain 1179 g of a polyphenylene oxide in a dry state having a reduced viscosity of 0.562 dl/g.

A compound comprising 45 parts (by weight, hereinafter the same) of the resulting polyphenylene oxide, 55 parts of a high-impact rubber-modified styrene resin ("Estyrene ® H63" produced by Nippon Steel Chemical Co., Ltd.), and 1 part of polyethylene ("Sumikathene ® E-210" produced by Sumitomo Chemical Company, Limited) was extruded in an extruder set at 260° C. to obtain pellets of a resin compound. The pellets were injection molded at 280° C. to produce test specimens for measurement of physical properties. The results obtained are shown in Table 1.

EXAMPLES 2 TO 12 AND COMPARATIVE EXAMPLES 1 AND 2

Polyphenylene oxides were produced in the same manner as in Example 1 except for changing the kinds and amounts of the alkanolamine and amine as shown in Table 1. The reduced viscosity of each of the resulting polyphenylene oxides is shown in Table 1. Test specimens were prepared in the same manner as in Example 1, and the results of measurement of physical properties are also shown in Table 1.

TABLE 1

| Example No. | Alkanolamine Kind | Amount (mol) | Amine Kind | Amount (mol) | ηsp/C (dl/g) | HDT (°C.) | Tensile Strength (kg/cm²) | Elongation (%) | $N_I$ (kg·cm/cm) | DuPont Impact Stength (kg·cm) |
|---|---|---|---|---|---|---|---|---|---|---|
| Example 1 | diethanolamine | 0.3 | di-n-butylamine | 0.15 | 0.562 | 122 | 550 | 140 | 21.7 | 280 |
| Example 2 | " | " | diethylamine | " | 0.528 | 121 | 520 | 120 | 20.5 | 260 |
| Example 3 | " | " | di-n-propylamine | " | 0.556 | 122 | 545 | 135 | 21.2 | 265 |
| Example 4 | " | " | diisobutylamine | " | 0.556 | 123 | 550 | 140 | 21.0 | 265 |
| Example 5 | " | " | piperidine | " | 0.534 | 121 | 540 | 150 | 20.2 | 270 |
| Example 6 | " | " | 2-pipecoline | " | 0.541 | 122 | 540 | 140 | 20.8 | 270 |
| Example 7 | " | " | n-propylamine | " | 0.575 | 123 | 525 | 125 | 21.0 | 185 |
| Example 8 | " | " | n-butylamine | " | 0.571 | 123 | 520 | 125 | 20.5 | 190 |
| Example 9 | " | " | isobutylamine | " | 0.541 | 122 | 535 | 100 | 20.3 | 225 |
| Example 10 | monoethanolamine | 0.5 | di-n-butylamine | 0.4 | 0.518 | 121 | 550 | 135 | 21.0 | 255 |
| Example 11 | N—methylethanolamine | " | " | 0.08 | 0.524 | 121 | 530 | 110 | 19.5 | 180 |
| Example 12 | diisopropanolamine | 0.3 | " | 0.015 | 0.546 | 122 | 545 | 120 | 20.2 | 260 |
| Comparative Example 1 | diethanolamine | 0.3 | — | — | 0.702 | 120 | 540 | 105 | 20.3 | 115 |
| Example 2 | — | — | di-n-butylamine | 0.15 | 0.165 | 96 | 180 | 35 | 6.8 | 35 |

EXAMPLE 13

In the same autoclave as in Example 1 were charged 3,567 g of xylene, 1,219 g of methanol, 1,222 g (10 mols) of 2,6-dimethylphenol, and 33.7 g (0.6 mol) of potassium hydroxide to form a uniform solution. To the solution was added a solution of 9.5 g (0.09 mol) of diethanolamine, 12.9 g (0.1 mol) of di-n-butylamine, and 0.44 g (0.0018 mol) of manganese acetate in 100 g of methanol. Air was then bubbled through the solution at a rate of 1.5 l/min while vigorous stirring. While continuing the bubbling, the reaction temperature and pressure were maintained at 40° C. and 9 kg/cm², respectively. After the elapse of 15 hours from the start of bubbling, the air feed was stopped. The obtained reaction mixture was subjected to the same treatment as in Example 1, and consequently 1,172 g of a polyphenylene oxide having a reduced viscosity of 0.526 dl/g was obtained. Test specimens were prepared in the same manner as in Example 1. The test specimens were measured to have a Du Pont impact strength of 210 kg·cm.

As described above, in the production of a polyphenylene oxide using a catalyst system basically composed of a manganese compound and a basic compound, the present invention characterized by combining the above catalyst system with a specific alkanolamine and a specific amine makes it possible to obtain a polyphenylene oxide suitable for the production of polyphenylene oxide-based polymer alloys. As is demonstrated in the Comparative Examples, the known catalyst system in which a combination of a manganese compound and a basic compound is further combined with an alkanolamine alone or an amine alone fails to produce a polyphenylene oxide suitable for preparing a polyphenylene oxide-based polymer alloy having excellent planar impact characteristics. To the contrary, the polyphenylene oxides obtain in the Examples exhibit markedly improved planar impact characteristics while retaining other physical properties. Therefore, the process using the catalyst system according to the present invention provides a high-quality polyphenylene oxide suitable as a starting material for the production of polyphenylene oxide-based polymer alloys, having considerable use value in industry.

While the invention has been described in detail and with reference to specific embodiments thereof, it will be apparent to one skilled in the art that various changes and modifications can be made therein without departing from the spirit and scope thereof.

What is claimed is:

1. A process for producing a polyphenylene oxide which comprises oxidative polymerization of a nucleus-substituted phenol with an oxygen-containing gas in an organic solvent in the presence of a catalyst comprising (1) a manganese compound containing at least one divalent manganese salt, (2) at least one basic compound selected from hydroxide, alkoxides or phenoxides of the group IA metals of the Periodic Table or hydroxides or oxides of the group IIA metals of the Periodic Table, (3) an alkanolamine represented by formula (I)

$$R^1—NH—R^2—OH \qquad (I)$$

wherein $R^1$ represents a hydrogen atom, an alkyl group having from 1 to 12 carbon atoms, or a hydroxyl-substituted alkyl group having from 1 to 12 carbon atoms; and $R^2$ represents an alkylene group having from 2 to 12 carbon atoms, and (4) an amine represented by formula (II)

$$R^3R^4NH \qquad (II)$$

wherein $R^3$ and $R^4$ each represents an alkyl group having from 1 to 24 carbon atoms, or an aralkyl group having from 7 to 24 carbon atoms, or $R^3$ and $R^4$ are taken together to form a ring.

2. A process as claimed in claim 1, wherein said alkanolamine is diethanolamine, diisopropanolamine, or monoethanolamine.

3. A process as claimed in claim 2, wherein said alkanolamine is diethanolamine.

4. A process as claimed in claim 1, wherein said alkanolamine is present in an amount of from 0.001 to 0.3 mol per mol of the nucleus-substituted phenol.

5. A process as claimed in claim 4, wherein said alkanolamine is present in an amount of from 0.005 to 0.1 mol per mol of the nucleus-substituted phenol.

6. A process as claimed in claim 1, wherein said amine is selected from diethylamine, di-n-propylamine, diisopropylamine, di-n-butylamine, diisobutylamine, piperidine, or 2-pipecoline.

7. A process as claimed in claim 6, wherein said amine is di-n-butylamine or piperidine.

8. A process as claimed in claim 1, wherein said amine is present in an amount of from 0.001 to 0.2 mol per mol of the nucleus-substituted phenol.

9. A process as claimed in claim 8, wherein said amine is present in an amount of from 0.005 to 0.05 mol per mol of the nucleus-substituted phenol.

10. A process as claimed in claim 1, wherein said manganese compound is present in an amount of 0.00001 mol or more per mol of the nucleus-substituted phenol.

11. A process as claimed in claim 10, wherein said manganese compound is present in an amount of 0.0001 mol or more per mol of the nucleus-substituted phenol.

12. A process as claimed in claim 1, wherein said basic compound is present in an amount of from 10 to 10,000 mols per mol of the manganese compound.

13. A process as claimed in claim 12, wherein said basic compound is present in an amount of from 50 to 1,000 mols per mol of the manganese compound.

* * * * *